United States Patent

[11] 3,601,202

| [72] | Inventor | Harlan Steffe<br>R.F.D., Boyden, Iowa 51234 |
|---|---|---|
| [21] | Appl. No. | 4,451 |
| [22] | Filed | Jan. 21, 1970 |
| [45] | Patented | Aug. 24, 1971<br>Continuation of application Ser. No.<br>622,500, Mar. 13, 1967, now abandoned. |

[54] RIDGE LEVELER AND STALK COVERER
8 Claims, 3 Drawing Figs.

| [52] | U.S. Cl. | 172/462,<br>172/484, 172/574 |
|---|---|---|
| [51] | Int. Cl. | A01b63/00,<br>A01b 5/00 |
| [50] | Field of Search | 172/461 |

[56] References Cited
UNITED STATES PATENTS

| 1,888,128 | 11/1932 | Hester | 172/574 |
|---|---|---|---|
| 2,558,890 | 7/1951 | White | 172/574 X |
| 3,244,237 | 4/1966 | Keplinger | 172/574 X |
| 123,858 | 2/1872 | Billups | 172/190 |
| 805,078 | 11/1905 | Kirkland | 172/333 |
| 3,175,522 | 3/1965 | Garber et al. | 172/462 X |
| 3,490,542 | 1/1970 | Eiten | 172/491 X |

*Primary Examiner*—William B. Penn
*Assistant Examiner*—Stephen C. Pellegrino
*Attorney*—James C. Nemmers ABSTRACT: A machine which mounts a number of pairs of colters behind a stalk cutter. The pairs of colters are positioned such that they cover material shredded by the stalk cutter and also level the ground by moving the soil which had been placed in rows by the prior years cultivation.

PATENTED AUG 24 1971

3,601,202

INVENTOR.
HARLAN STEFFE

BY *[signature]*

ATTORNEY

RIDGE LEVELER AND STALK COVERER

This is a continuation of application Ser. No. 622,500, filed Mar. 13, 1967, now abandoned.

This invention relates in general to agriculture machinery and in particular to a new and novel leveler and stalk coverer.

At the end of each year's cultivation it is desirable to prepare the soil for the next year's planting. The old stalks should be covered to allow them to rot and form humus and the land should be leveled in preparation for the new cultivating season.

The present invention comprises a combination stalk coverer and ground leveler which may be mounted on a stalk shredder to cover the stalks and level the ground.

An object of this invention is found in the provision for a plurality of pairs of colters mounted on a stalk-shredder machine so as to cover the shredded stalks and to level the ground.

Another object is to provide an improved cultivation machine.

A feature of this invention is found in the provision for a plurality of pairs of colters which are mounted behind a stalk shredder so as to cover the stalks and level the ground.

Further features, objects and advantages will become apparent from the following description and claims when read in view of the drawings, in which:

Figure 1:
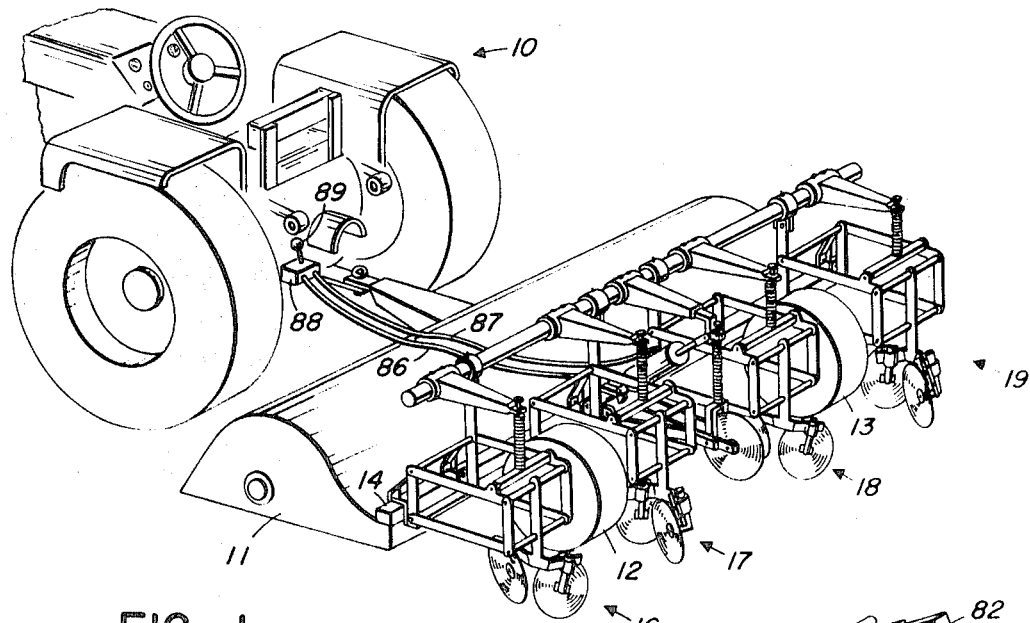
FIG. 1 is a perspective view of my machine mounted on a stalk shredder.
Figure 2:
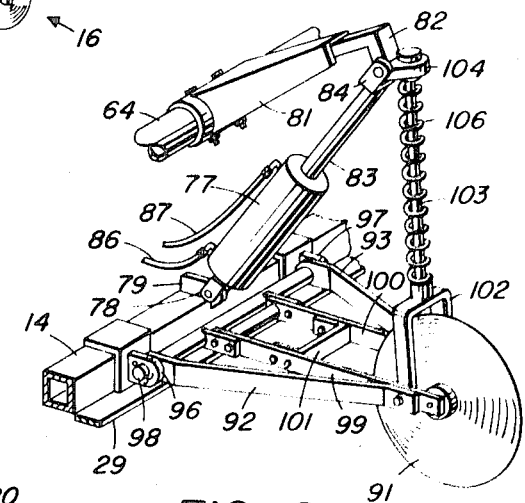
FIG. 2 is a detailed view of the stabilizer colter and lifting mechanism.

FIG. 1 illustrates a tractor 10 to which is attached a stalk shredder 11 of standard manufacture. The stalk shredder has ground wheels 12 and 13 that are supported from its frame and a tool bar 14 is attached to the rear portion of the stalk shredder and extends the full length of the shredder.

My invention attaches to the tool bar 14 and covers the shredded material and levels the ground behind the shredder. It is to be realized that my invention could be mounted on any standard tool bar of common make and could be used in cotton, tobacco, beets or other fields where ridges are left by previous years' cultivation.

The preferred embodiment will be shown and described attached to the tool bar 14 of the stalk shredder 11.

Figure 3:
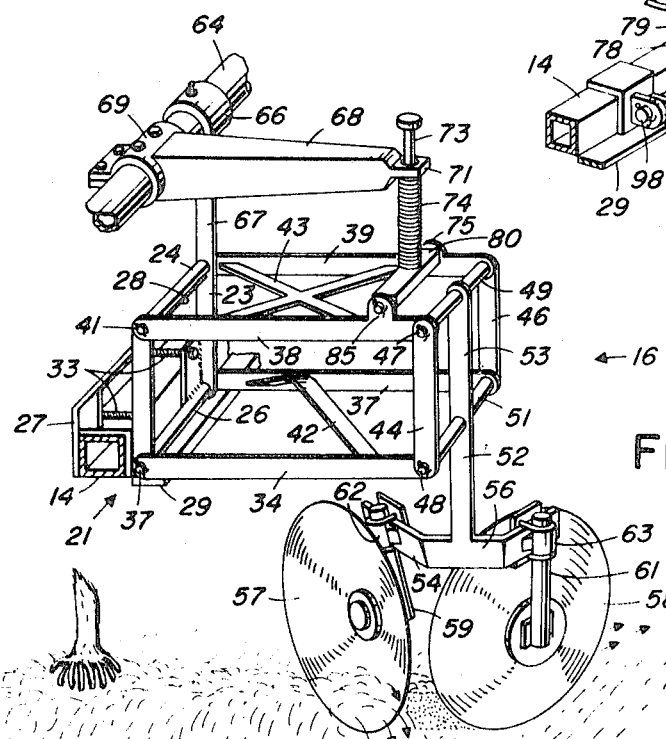
FIG. 3 is a detailed view of one pair of cutting colters and their supporting structure.

Pairs of cutting colters are mounted on the tool bar 14 so that they cover material passed over and also level the ground. For example, four colter supports 16, 17, 18 and 19 are shown in FIG. 1 mounted on tool bar 14. These supports are substantially the same and support 16 will be described in detail relative to FIG. 3. A frame member 21 comprising uprights 22 and 23 and hollow crossmembers 24 and 26 are attached to the tool bar by clamps 27 and 28. A bar 29 extends between the lower ends of uprights 22 and 23 and is attached to a portion 31 of the clamps 27 and 28. Bolts 32 and 33 tighten the assembly to hold it to the tool bar 14.

A parallelogram is formed from opposite ends of uprights 22 and 23 by lower bars 34 and 36 which are pivotally attached by rod 37 and by upper bars 38 and 39 which are attached by rod 41 to the upper ends of uprights 22 and 23.

A cross brace 42 extends between bars 34 and 36 and an X-brace 43 is attached to bars 38 and 39.

Upright bars 44 and 46 are pivotally attached by rods 47 and 48 to the outer ends of bars 34, 36 and 38, 39. Hollow supports 49 and 51 extend between bars 44 and 46 and hold rods 47 and 48.

A generally T-shaped colter holder 52 has its leg 53 attached to supports 49 and 51 between uprights 44 and 46 and has lower legs 54 and 56 which support a pair of colters 57 and 58.

The colters 57 and 58 are rotatably supported on L-shafts 59 and 61 which have their upper ends attached to legs 54 and 56 by clamps 62 and 63.

The parallelogram thus formed may be moved to adjust the colters up and down in the following manner. A shaft 64 is rotatable supported by a bracket 66 attached to an extension 67 of upright 23. It is to be realized that each of the colter supports 16, 17, 18 and 19 support the shaft 64. An arm 68 is rigidly attached by clamp 69 to shaft 64. The outer end 71 is formed with hole 72 through which a bolt 73 extends.

A spring 74 fits over bolt 73 between end 71 and bar 80 which is pivotally attached by brackets 75 and 85 to bars 38 and 39. Thus, means are provided such that if shaft 64 is rotated counterclockwise relative to the figures the colters will be lifted and if the shaft 64 is rotated clockwise they will be lowered.

The other colters supports 17, 18 and 19 are the same as support 16 and are mounted on bar 14 so as to align with the rows to be flattened. It is to be realized that all the machines may be constructed with differing numbers of colter supports.

Attached to the center portion of the bar 14 is a hydraulic cylinder 77 for rotating shaft 64 and thus control the colter supports 16, 17, 18 and 19. The lower end 78 of the cylinder 77 is pivotally attached to bar 14 by bracket 79. A control arm 81 has one end rigidly attached to shaft 64 and the other end is attached to a bracket 82. The piston shaft 83 of cylinder 77 has its upper end 84 pivotally attached to bracket 82. Hydraulic lines 86 and 87 extend from the cylinder to a control box 88 which is connected to the hydraulic power source of the tractor. A control handle 89 is mounted on box 88 and allows selective activation of the cylinder 77.

A flat stabilizing colter 91 is mounted to the bar 14 below cylinder 77 by arms 92 and 93 which are pivotally supported by hollow shaft 94, brackets 96 and 97 and shaft 98. Braces 99 and 100 extend from shaft 94 to colter 91 and a cross brace 101 extends between braces 99 and 100.

A U-shaped bracket 102 is attached to braces 99 and 100 and the lower end of a bolt 103 is attached to it. The upper end of bolt 103 is attached to an extension 104 of bracket 82 and a spring 106 is mounted about the bolt 103 between bracket 102 and extension 104.

The placement of the colters 57 and 58 is very important. They must be so positioned that they level completely the row formed from the prior cultivation. I have found that by positioning them at about 90° when looking straight down and by tilting them at an angle of about 30° from the vertical that ideal results are obtained in that the ground is leveled and the shredded material is covered. In other words, the axis of rotation of the colters 57 and 58 is 30° from the horizontal.

In use the operator of the tractor may lower or raise the colters to the desired position for the particular conditions.

The stabilizing colter 91 moves with the cutting colters and stabilizes and prevents jumping around of the machine.

It is seen that this invention provides an improved agriculture machine for leveling and covering.

Although it has been described with respect to preferred embodiments, it is not to be so limited as changes and modifications may be made which are within the full intended scope of the appended claims.

I claim:

1. An agriculture machine for leveling and covering the ground, said machine comprising a main supporting frame, said frame including a frame member positioned transversely to the direction of travel of the machine, a first pair of lower bars pivotally attached to said transverse frame member, a pair of vertical extensions attached to said transverse frame member, a first pair of upper bars pivotally attached to the upper ends of the vertical extensions, a pair of vertical links pivotally attached to the ends of the pair of lower bars and upper bars, a pair of horizontal members extending between the ends of the two upper bars and the two lower bars, a T-shaped colter holder attached to the pair of horizontal members, and a pair of colters rotatably mounted on the legs of the T-shaped colter holder, said colters being positioned substantially 90° from each other when viewed from the top to throw soil in opposite directions with the planes of the colters positioned at about 30° from the vertical so that ridges of soil engaged by the colters are leveled.

2. The agriculture machine of claim 1 wherein the legs of the T-shaped colter holder are bent to support the colters at 90° to each other.

3. In the agriculture machine of claim 2, L-shaped colter brackets attached to the T-shaped colter holder and rotatably supporting the colters so that they are positioned at an angle of about 30° with the vertical.

4. For use in connection with a prime mover and a carriage connected thereto capable of being towed by said prime mover, said carriage including a tool bar extending transversely to the direction of travel, an agricultural implement for leveling ridges of soil, said implement comprising a plurality of vertically extending upright supports adapted to be removably attached to said tool bar, colter supports extending rearwardly from and pivotally connected directly to said upright supports, said upright and colter supports being adjustably spaced apart transversely to the direction of travel so as to correspond to the ridges of soil to be leveled, at least two rotatable colters attached to each of said colter supports, one of said colters being positioned in a plane substantially 90° relative to the other of said colters when viewed from the top, each colter being independent of the other and positioned at an angle to the direction of travel of the implement to throw soil in opposite directions so that ridges of soil engaged by the colters are leveled, said colter and upright supports providing for vertical adjustability of the colters so as to control the height thereof relative to the ground without substantially changing the angle of the colters relative to the ground, lift means for selectively raising and lowering the colters, said lift means including a control shaft turnably supported on the upper ends of said upright supports so as to be turnable about an axis substantially parallel to said tool bar when said implement is connected thereto the axis of said control arm being thereby fixed relative to said tool bar, a plurality of arms connected to and extending rearwardly from and turnable with said control shaft connecting member, said arms connecting directly to said colter supports, and means removably attachable to and supported by said carriage when so attached for selectively turning the control shaft to cause said colter supports to pivot on said upright supports and thereby raise and lower the colters.

5. The agriculture implement of claim 4 in which said colter supports each include a lower member extending rearwardly and having its forward end pivotally connected to one of said upright supports, an upper member in substantially the same plane as said lower member pivotally connected at its forward end to said upright support at a point above the pivotal connection between said lower member and said upright support, and a connecting member pivotally connected between said upper and lower members, said pair of colters being attached to said lower member near the outer end thereof.

6. The agriculture implement of claim 5 in which said upright support, upper member, lower member and connecting member form a parallelogram.

7. The agriculture implement of claim 4 in which said means for selectively turning the control shaft includes a control arm connected to the control shaft and pivotally movable relative thereto, a hydraulic cylinder operatively connected to the control arm, and means for controlling hydraulic fluid to the cylinder.

8. In the agriculture implement of claim 7 a stabilizing colter pivotally attachable to and extending rearwardly from said tool, said stabilizing colter being operatively connected to said control shaft so as to be movable up and down with said colter supports, said stabilizing colter being positioned with the plane of the colter substantially vertical and in the direction of movement of the machine.